UNITED STATES PATENT OFFICE.

WILLIAM JOHN WILLIAMS, OF CAMDEN, NEW JERSEY, ASSIGNOR TO THE KEYSTONE CHEMICAL COMPANY, OF PHILADELPHIA, PENNSYLVANIA.

ANTI-INCRUSTATION COMPOUND.

SPECIFICATION forming part of Letters Patent No. 370,583, dated September 27, 1887.

Application filed October 15, 1886. Serial No. 216,342. (Specimens.)

*To all whom it may concern:*

Be it known that I, WILLIAM JOHN WILLIAMS, a subject of the Queen of Great Britain and Ireland, residing in Camden, New Jersey, have invented an Improved Anti-Incrustating Compound, of which the following is a specification.

My invention consists of an improved compound for preventing the formation of scale in steam-boilers, or, as it is sometimes called, an "anti-incrustating compounds."

I prevent the formation of scale in steam-boilers by the use of trisodium phosphate. Phosphate of soda has heretofore been proposed as a means of preventing incrustation in steam-generators. (See, for instance, the British patent of Travis, No. 1,384 of 1863; but the commercial phosphate of soda there meant was disodium phosphate.) My compound, however, has important practical advantages over the disodium phosphate, for reasons which I will explain. All waters contain more or less sulphates and carbonates of lime and magnesia. If these are precipitated by the ordinary disodium phosphate of commerce, the phosphoric acid will decompose three equivalents of sulphate of lime, forming calcium phosphate and setting free three equivalents of sulphuric acid. Two of these equivalents will be neutralized by the sodium of the disodium phosphate, leaving one equivalent of free sulphuric acid to injuriously act on the boiler-iron. By the use of trisodium phosphate, however, there are three equivalents of soda present to neutralize the whole of the three equivalents of sulphuric acid set free, thus avoiding the production of any free acid in the boiler. Again, many waters contain alumina phosphate, (alum,) where one equivalent of alumina is combined with three equivalents of sulphuric acid. Here, as with sulphate of lime, trisodium phosphate will neutralize the three equivalents of sulphuric acid by its three equivalents of soda, while the ordinary commercial disodium phosphate will only neutralize two equivalents and leave one equivalent (or one-third of the acid in the alumina sulphate) as free acid to act injuriously on the boiler-iron.

Trisodium phosphate, though strongly alkaline, is not caustic, yet it readily parts with one-third of its soda to any free acid in the water, or even with one-half of its soda if the free acid is present in large quantity. On the other hand, disodium phosphate will not readily part with any of its soda, though if a free acid be present in large quantity it will give up a small quantity of its soda. Thus trisodium neutralizes free acid readily, while the common phosphate of soda can scarcely be said to neutralize it at all.

Many waters, especially in mining districts, contain large quantities of free sulphuric acid, and waters in marshy districts contain tannic acid. In these cases the trisodium phosphate, therefore, will be available, while the ordinary disodium phosphate would be practically of little or no use. The calcium, magnesium, or other earthy salts in the hard waters which are used in steam-boilers are converted by the trisodic phosphate into calcium and magnesium or other phosphates which are in a very light flocculent and gelatinous form, and which can be driven out of the boiler by the ordinary "blowing-off" process. These light flocculent phosphates do not settle down and burn on the iron as do calcium or magnesium carbonates and sulphates, which are heavy, dense, and crystalline in form. By thus converting the calcium, magnesium, or other carbonate or sulphate into the corresponding phosphate without leaving any free acid in the water, the hard water is practically made soft, and incrustation is prevented without injury to the iron of the boiler.

I claim as my invention—

1. The herein-described anti-incrustating compound, consisting of trisodic phosphate, as set forth.

2. The mode herein described of preventing incrustation in steam-boilers, said mode consisting in adding to the water trisodic phosphate to convert the contained sulphate, carbonate, or other salts into phosphates without leaving free acid to injure the iron, substantially as set forth.

3. The mode herein described of preventing incrustation in steam-boilers, said mode consisting in adding to the water trisodic phosphate to convert the contained sulphate, carbonate, or other salts into phosphates, and then blowing off the latter, all substantially as set forth.

In testimony whereof I have signed my name to this specification in the presence of two subscribing witnesses.

WILLIAM JOHN WILLIAMS.

Witnesses:
  W. J. LEDDELL,
  M. G. DAVIS.